(12) United States Patent
Belt et al.

(10) Patent No.: US 8,181,413 B2
(45) Date of Patent: *May 22, 2012

(54) SHINGLE WITH REINFORCED NAIL ZONE AND METHOD OF MANUFACTURING

(75) Inventors: James S. Belt, Utica, OH (US); Bert W. Elliott, Toledo, OH (US)

(73) Assignee: Owens Corning Intellectual Capital, LLC, Toledo, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/895,195

(22) Filed: Sep. 30, 2010

(65) Prior Publication Data

US 2011/0016812 A1 Jan. 27, 2011

Related U.S. Application Data

(63) Continuation of application No. 11/198,522, filed on Aug. 5, 2005, now Pat. No. 7,836,654.

(51) Int. Cl.
*E04D 1/00* (2006.01)

(52) U.S. Cl. ............................................ 52/557; 52/527

(58) Field of Classification Search .................... 52/314, 52/315, 523, 525, 527, 540, 554, 555, 557, 52/559

See application file for complete search history.

(56) References Cited

U.S. PATENT DOCUMENTS

| | | | |
|---|---|---|---|
| 835,889 A * | 11/1906 | Moeller | ........................... 52/521 |
| 1,597,135 A | 8/1926 | Wittenberg | |
| 1,601,731 A | 10/1926 | Flood | |
| 1,665,222 A | 4/1928 | Robinson | |
| 1,701,926 A | 2/1929 | Kirschbraun | |
| 1,799,500 A | 4/1931 | Brophy | |
| 2,161,440 A | 6/1939 | Venrick | |
| 2,798,006 A | 7/1957 | Oldfield et al. | |
| 2,847,948 A | 8/1958 | Truitt | |

(Continued)

FOREIGN PATENT DOCUMENTS

CA 1207975 7/1986

(Continued)

OTHER PUBLICATIONS

Office Action dated Mar. 2, 2011, U.S. Appl. No. 11/997,657, filed Nov. 5, 2008.

(Continued)

*Primary Examiner* — Brian Glessner
*Assistant Examiner* — Adriana Figueroa
(74) *Attorney, Agent, or Firm* — MacMillan, Sobanski & Todd, LLC

(57) ABSTRACT

A roofing shingle is provided. The roofing shingle includes an overlay sheet including a headlap portion and a tab portion and an underlay sheet secured to the overlay sheet such that a region of the underlay sheet overlaps a region of the headlap portion of the overlay sheet. Said underlay sheet has a substantially uniform thickness. A reinforcement member is secured to the headlap portion. The reinforcement member is formed from a material selected from the group consisting of paper, film, scrim, woven, and non-woven material. The reinforcement member and the portion of the headlap portion to which the reinforcement member is secured to improve nail pull-through. At least some of the reinforcement member does not overlap the overlapping regions of the headlap portion and the underlay sheet. Said reinforcement member provides said overlay sheet with a non-uniform thickness.

33 Claims, 3 Drawing Sheets

U.S. PATENT DOCUMENTS

| | | | | |
|---|---|---|---|---|
| 3,054,222 | A * | 9/1962 | Buckner | 52/543 |
| 3,082,577 | A * | 3/1963 | Arthur et al. | 52/543 |
| 3,180,783 | A * | 4/1965 | Walker et al. | 428/148 |
| 3,252,257 | A | 5/1966 | Price et al. | |
| 3,377,762 | A | 4/1968 | Chalmers | |
| 3,468,086 | A | 9/1969 | Warner | |
| 3,468,092 | A | 9/1969 | Chalmers | |
| 3,624,975 | A | 12/1971 | Morgan et al. | |
| 3,664,081 | A | 5/1972 | Martin et al. | |
| 4,301,633 | A * | 11/1981 | Neumann | 52/309.4 |
| 4,459,157 | A | 7/1984 | Koons | |
| 4,680,909 | A | 7/1987 | Stewart | |
| 4,706,435 | A | 11/1987 | Stewart | |
| 4,717,614 | A * | 1/1988 | Bondoc et al. | 428/143 |
| 4,755,545 | A | 7/1988 | Lalwani | |
| 4,817,358 | A | 4/1989 | Lincoln et al. | |
| 4,824,880 | A * | 4/1989 | Algrim et al. | 524/62 |
| 4,848,057 | A * | 7/1989 | MacDonald et al. | 52/518 |
| 4,952,268 | A * | 8/1990 | Beck et al. | 156/295 |
| 5,181,361 | A | 1/1993 | Hannah et al. | |
| 5,209,802 | A | 5/1993 | Hannah et al. | |
| 5,239,802 | A | 8/1993 | Robinson | |
| 5,251,416 | A * | 10/1993 | White | 52/410 |
| 5,426,902 | A | 6/1995 | Stahl et al. | |
| 5,571,596 | A * | 11/1996 | Johnson | 428/143 |
| 5,577,361 | A * | 11/1996 | Grabek, Jr. | 52/543 |
| 5,660,014 | A | 8/1997 | Stahl et al. | |
| 5,822,943 | A * | 10/1998 | Frankoski et al. | 52/518 |
| 5,901,517 | A | 5/1999 | Stahl et al. | |
| 5,916,103 | A | 6/1999 | Roberts | |
| 5,950,387 | A | 9/1999 | Stahl et al. | |
| 6,010,589 | A | 1/2000 | Stahl et al. | |
| 6,021,611 | A | 2/2000 | Wells et al. | |
| 6,038,826 | A | 3/2000 | Stahl et al. | |
| 6,044,608 | A | 4/2000 | Stahl et al. | |
| 6,083,592 | A * | 7/2000 | Chich | 428/40.3 |
| 6,145,265 | A | 11/2000 | Malarkey et al. | |
| 6,148,578 | A | 11/2000 | Nowacek et al. | |
| 6,199,338 | B1 | 3/2001 | Hudson, Jr. et al. | |
| 6,220,329 | B1 | 4/2001 | King et al. | |
| 6,343,447 | B2 | 2/2002 | Geissels et al. | |
| 6,355,132 | B1 | 3/2002 | Becker et al. | |
| 6,397,546 | B1 | 6/2002 | Malarkey et al. | |
| 6,397,556 | B1 * | 6/2002 | Karpinia | 52/748.1 |
| 6,471,812 | B1 * | 10/2002 | Thompson et al. | 156/242 |
| 6,487,828 | B1 | 12/2002 | Phillips | |
| 6,523,316 | B2 | 2/2003 | Stahl et al. | |
| 6,610,147 | B2 | 8/2003 | Aschenbeck | |
| 6,652,909 | B2 | 11/2003 | Lassiter | |
| 6,679,020 | B2 | 1/2004 | Becker et al. | |
| 6,679,308 | B2 | 1/2004 | Becker et al. | |
| 6,708,456 | B2 | 3/2004 | Kiik et al. | |
| 6,709,994 | B2 | 3/2004 | Miller et al. | |
| 6,758,019 | B2 | 7/2004 | Kalkanoglu et al. | |
| 6,804,919 | B2 | 10/2004 | Railkar | |
| 6,823,637 | B2 | 11/2004 | Elliott et al. | |
| 6,990,779 | B2 | 1/2006 | Kiik et al. | |
| 7,082,724 | B2 | 8/2006 | Railkar et al. | |
| 7,118,794 | B2 * | 10/2006 | Kalkanoglu et al. | 428/143 |
| 7,765,763 | B2 | 8/2010 | Teng et al. | |
| 7,781,046 | B2 | 8/2010 | Kalkanoglu et al. | |
| 2001/0049002 | A1 | 12/2001 | Mccumber et al. | |
| 2003/0040241 | A1 | 2/2003 | Kiik et al. | |
| 2003/0093963 | A1 | 5/2003 | Stahl et al. | |
| 2004/0055240 | A1 | 3/2004 | Kiik et al. | |
| 2004/0083673 | A1 | 5/2004 | Kalkanoglu et al. | |
| 2004/0083674 | A1 * | 5/2004 | Kalkanoglu et al. | 52/555 |
| 2004/0206035 | A1 | 10/2004 | Kandalgaonkar | |
| 2004/0258883 | A1 * | 12/2004 | Weaver | 428/143 |
| 2005/0204675 | A1 * | 9/2005 | Snyder et al. | 52/555 |
| 2006/0032174 | A1 | 2/2006 | Floyd | |
| 2006/0179767 | A1 | 8/2006 | Miller et al. | |
| 2006/0265990 | A1 | 11/2006 | Kalkanoglu et al. | |
| 2008/0134612 | A1 | 6/2008 | Koschitzky | |
| 2010/0077689 | A1 | 4/2010 | Kalkanoglu et al. | |
| 2010/0143667 | A1 | 6/2010 | Collins et al. | |
| 2010/0310825 | A1 | 12/2010 | Kalkanoglu et al. | |

FOREIGN PATENT DOCUMENTS

| | | |
|---|---|---|
| CN | 2176391 | 9/1994 |
| JP | 50002937 | 1/1975 |
| WO | 2007108846 | 9/2007 |
| WO | 2008052029 | 5/2008 |

OTHER PUBLICATIONS

Response to the Office Action dated Mar. 2, 2011, U.S. Appl. No. 11/997,657, filed Nov. 5, 2008.

Notification of Ground(s) for Rejection, Application No. JP2008-525265, Dated Dec. 12, 2011.

Notification of Ground(s) for Rejection Translation, Application No. JP2008-525265, Dated Dec. 12, 2011.

* cited by examiner

SHINGLE WITH REINFORCED NAIL ZONE AND METHOD OF MANUFACTURING

RELATED APPLICATIONS

This application is a continuation patent application of U.S. patent Ser. No. 11/198,522, filed Aug. 5, 2005, Now U.S. Pat. No. 7,836,654, issued Nov. 23, 2010, the disclosure of which is incorporated herein by reference.

TECHNICAL FIELD

This invention relates to a shingle, such as a roofing shingle, and in particular, to a roofing shingle having an improved nail zone.

BACKGROUND OF THE INVENTION

Asphalt-based roofing materials, such as roofing shingles, roll roofing and commercial roofing, are installed on the roofs of buildings to provide protection from the elements, and to give the roof an aesthetically pleasing look. Typically, the roofing material is constructed of a substrate such as a glass fiber mat or an organic felt, an asphalt coating on the substrate, and a surface layer of granules embedded in the asphalt coating.

A common method for the manufacture of asphalt shingles is the production of a continuous sheet of asphalt material followed by a shingle cutting operation, which cuts the material into individual shingles. In the production of asphalt sheet material, either a glass fiber mat or an organic felt mat is passed through a coater containing hot liquid asphalt to form a tacky, asphalt coated sheet. Subsequently, the hot asphalt coated sheet is passed beneath one or more granule applicators, which discharge protective and decorative surface granules onto portions of the asphalt sheet material.

In certain types of shingles, it is especially desired that the shingles define a sufficiently wide area, often known in the industry as the "nail zone," in order to make installation of roofs using shingles, such as laminated shingles, more efficient and secure. One or more lines or other indicia painted or otherwise marked longitudinally on the surface of the shingle may define such a nail zone. It is especially desired that the shingles define a nail zone that allows the installers to have some latitude in the nail placement.

Additionally, the leading edge of some shingles may experience lift off in high wind situations. Therefore, there is also a need for shingles where the shingles have a sufficiently high nail pull-through value so that the installed shingles have improved performance in high wind situations.

SUMMARY OF THE INVENTION

The above objects as well as other objects not specifically enumerated are achieved by a roofing shingle. The roofing shingle includes an overlay sheet including a headlap portion and a tab portion and an underlay sheet secured to the overlay sheet such that a region of the underlay sheet overlaps a region of the headlap portion of the overlay sheet. Said underlay sheet has a substantially uniform thickness. A reinforcement member is secured to the headlap portion. The reinforcement member is formed from a material selected from the group consisting of paper, film, scrim, woven, and non-woven material. The reinforcement member and the portion of the headlap portion to which the reinforcement member is secured to improve nail pull-through. At least some of the reinforcement member does not overlap the overlapping regions of the headlap portion and the underlay sheet. Said reinforcement member provides said overlay sheet with a non-uniform thickness.

According to this invention there is also provided a roofing shingle. The roofing shingle includes an overlay sheet including a headlap portion and a tab portion. An underlay sheet is secured to the overlay sheet such that a region of the underlay sheet overlaps a region of the headlap portion of the overlay sheet, said underlay sheet having a uniform thickness. A reinforcement member is secured to the headlap portion, the reinforcement member being formed from a woven material. At least some of the reinforcement member does not overlap the overlapping regions of the headlap portion and the underlay sheet. The headlap portion defines a first nail pull-through value. The reinforcement member and the headlap portion define a second nail pull-through value that is at least 13.3 percent greater than the first nail pull-through value. Said reinforcement member provides said overlay sheet with a non-uniform thickness.

Various objects and advantages of this invention will become apparent to those skilled in the art from the following detailed description of the various embodiments, when read in light of the accompanying drawings.

DETAILED DESCRIPTION OF THE INVENTION

Figure 1:
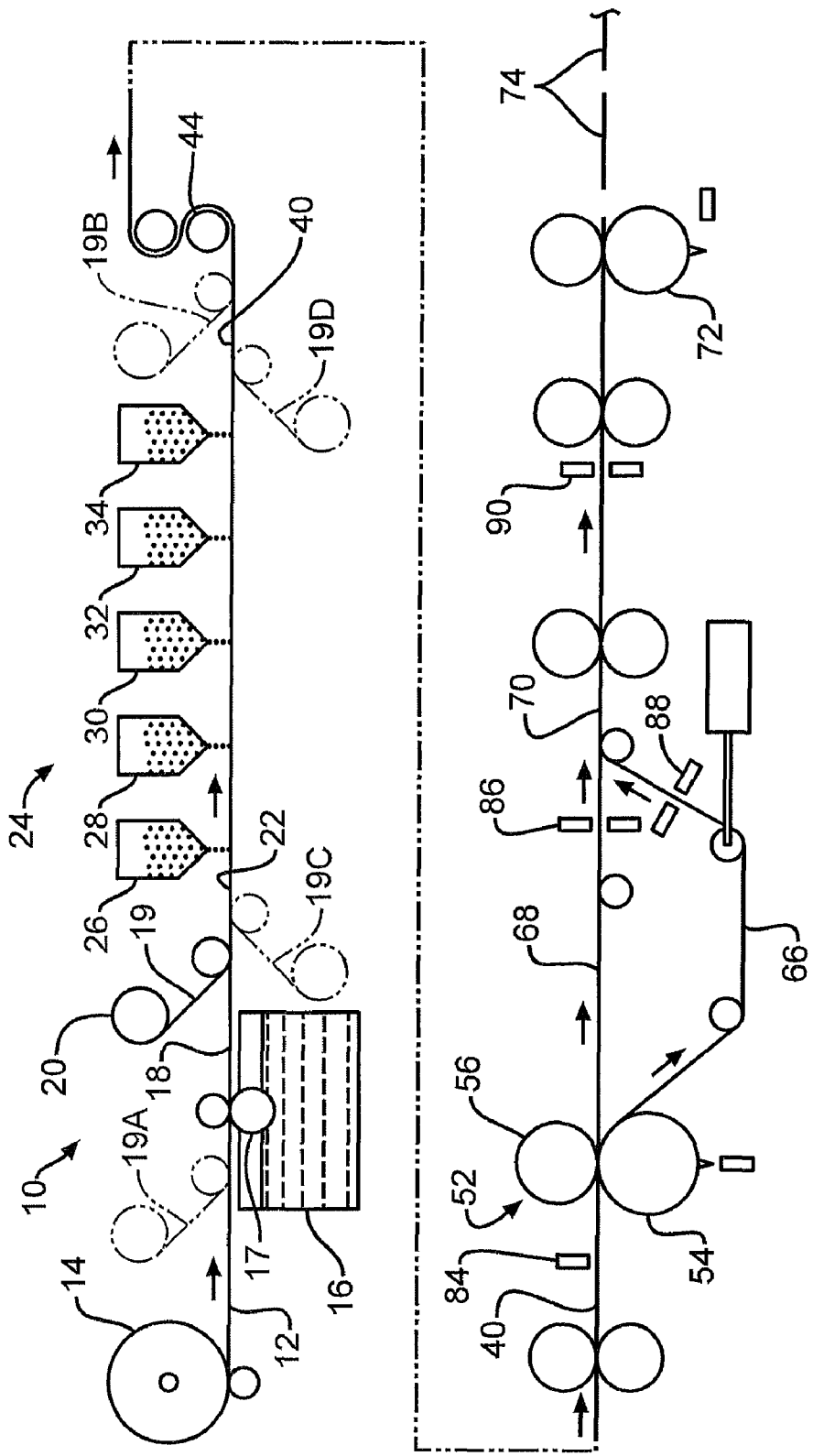
FIG. 1 is a schematic elevational view of an apparatus for making shingles according to the invention.

Referring now to the drawings, there is shown in FIG. 1 an apparatus 10 for manufacturing an asphalt-based roofing material according to the invention. In the illustrated embodiment, the manufacturing process involves passing a continuous sheet 12 in a machine direction (indicated by the arrows) through a series of manufacturing operations. The sheet usually moves at a speed of at least about 200 feet/minute (61 meters/minute), and typically at a speed within the range of between about 450 feet/minute (137 meters/minute) and about 800 feet/minute (244 meters/minute). The sheet, however, may move at any desired speed.

In a first step of the illustrated manufacturing process, a continuous sheet of substrate or shingle mat 12 is payed out from a roll 14. The substrate can be any type known for use in reinforcing asphalt-based roofing materials, such as a non-woven web of glass fibers. The shingle mat 12 may be fed through a coater 16 where an asphalt coating is applied to the mat 12. The asphalt coating can be applied in any suitable manner. In the illustrated embodiment, the mat 12 contacts a roller 17, that is in contact with a supply of hot, melted asphalt. The roller 17 completely covers the mat 12 with a tacky coating of hot, melted asphalt to define a first asphalt coated sheet 18. In other embodiments, however, the asphalt coating could be sprayed on, rolled on, or applied to the sheet by other means. Typically, the asphalt material is highly filled with a ground stone filler material, amounting to at least about 60 percent by weight of the asphalt/filler combination.

A continuous strip of a reinforcement material or tape 19, as will be described in detail herein, may then be payed out from a roll 20. The reinforcement tape 19 adheres to the first asphalt coated sheet 18 to define a second asphalt coated sheet 22. In one embodiment, the reinforcement tape 19 is attached to the sheet 18 by the adhesive mixture of the asphalt in the first asphalt coated sheet 18. The reinforcement tape 19, however, may be attached to the sheet 18 by any suitable means, such as other adhesives. In one embodiment, the tape 19 is formed from polyester. In another embodiment, the tape 19 is formed from polyolefin, such as polypropylene or polyethylene. The tape 19, however, can be formed from any material for reinforcing and strengthening the nail zone of a shingle, such as, for example, paper, film, scrim material, and woven or non-woven glass.

The resulting second asphalt coated sheet 22 may then be passed beneath a series of granule dispensers 24 for the application of granules to the upper surface of the second asphalt coated sheet 22. The granule dispensers can be of any type suitable for depositing granules onto the asphalt coated sheet. A granule dispenser that can be used is a granule valve of the type disclosed in U.S. Pat. No. 6,610,147 to Aschenbeck. The initial granule blender 26 may deposit partial blend drops of background granules of a first color blend on the tab portion of the second asphalt coated sheet 22 in a pattern that sets or establishes the trailing edge of subsequent blend drops of a second color blend (of an accent color) and a third color blend (of a different accent color). For purposes of this patent application, the first color blend and the background granules are synonymous. The use of initially applied partial blend drops to define the trailing edge of subsequent blend drops is useful where accurate or sharp leading edges are possible, but accurate trailing edges at high shingle manufacturing speeds are difficult.

As is well known in the art, blend drops applied to the asphalt coated sheet are often made up of granules of several different colors. For example, one particular blend drop that is supposed to simulate a weathered wood appearance might actually consist of some brown granules, some dark gray granules, and some light gray granules. When these granules are mixed together and applied to the sheet in a generally uniformly mixed manner, the overall appearance of weathered wood is achieved. For this reason, the blend drops are referred to as having a color blend, which gives an overall color appearance. This overall appearance may be different from any of the actual colors of the granules in the color blend. Also, blend drops of darker and lighter shades of the same color, such as, for example, dark gray and light gray, are referred to as different color blends rather than merely different shades of one color.

As shown in FIG. 1, the series of dispensers 24 includes four color blend blenders 26, 28, 30, and 32. Any desired number of blenders, however, can be used. The final blender may be the background blender 34. Each of the blenders may be supplied with granules from sources of granules, not shown. After the blend drops are deposited on the second asphalt coated sheet 22, the remaining, uncovered areas are still tacky with warm, uncovered asphalt, and the background granules from the background blender 34 will adhere to the areas that are not already covered with blend drop granules. After all the granules are deposited on the second asphalt coated sheet 22 by the series of dispensers 24, the sheet 22 becomes a granule covered sheet 40.

Figure 2:
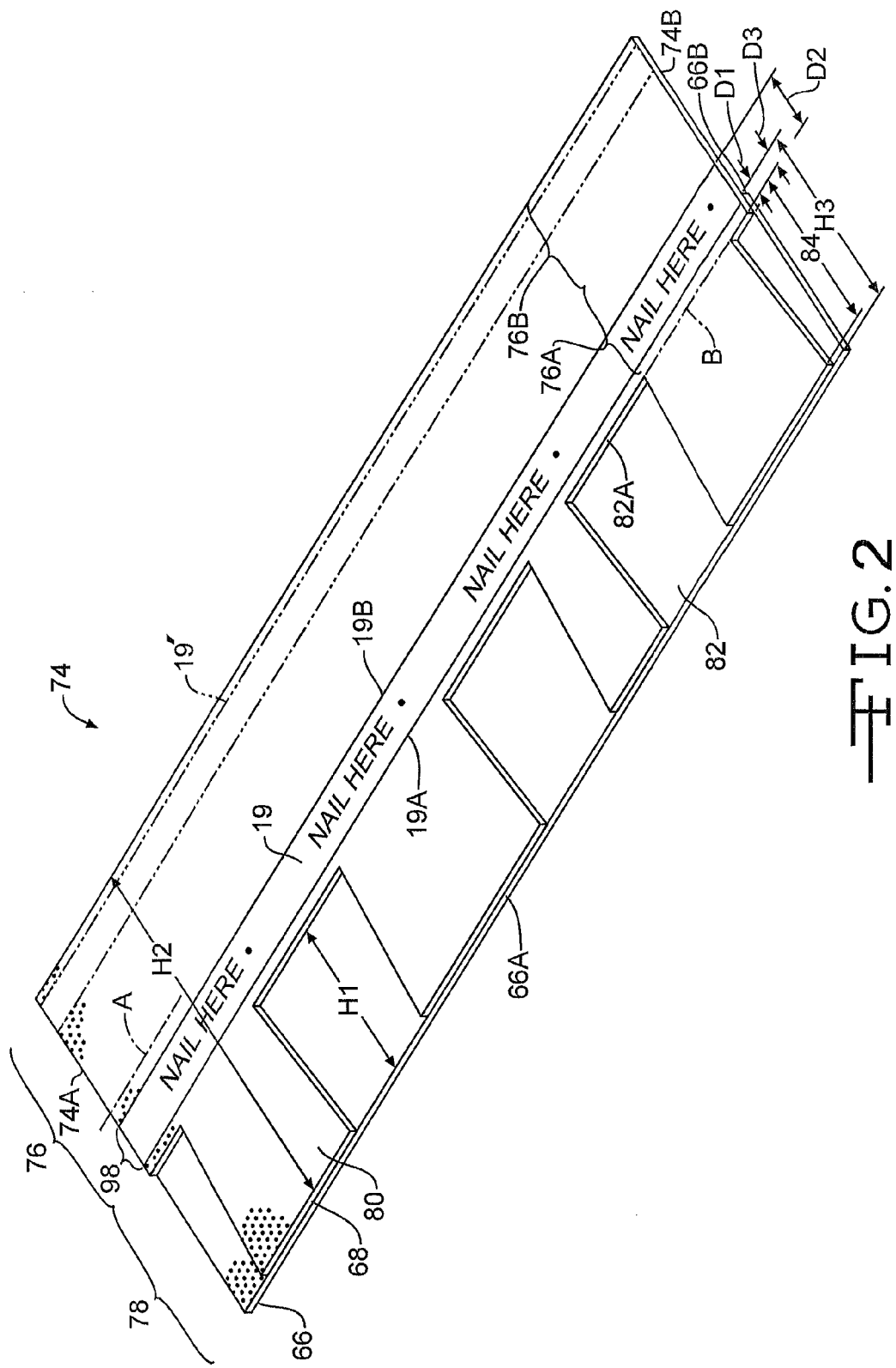
FIG. 2 is a perspective view of a laminated shingle having a reinforcement member in accordance with this invention.

In one embodiment, the reinforcement tape 19 includes an upper surface to which granules substantially will not adhere. The reinforcement tape 19, however, may include an upper surface to which granules will adhere. For example, the apparatus 10 may include any desired means for depositing granules onto substantially the entire second asphalt coated sheet 22, except for the portion of the second asphalt coated sheet 22 covered by the tape 19, as best shown in FIG. 2. Alternately, granules may be deposited onto substantially the entire second asphalt coated sheet 22, including the tape 19, but wherein the reinforcement tape 19 includes an upper surface to which granules substantially will not adhere.

The granule covered sheet 40 may then be turned around a slate drum 44 to press the granules into the asphalt coating and to temporarily invert the sheet so that the excess granules will fall off and will be recovered and reused. Typically, the granules applied by the background blender 34 are made up by collecting the backfall granules falling from the slate drum 44.

The granule covered sheet 40 may subsequently be fed through a rotary pattern cutter 52, which includes a bladed cutting cylinder 54 and a backup roll 56, as shown in FIG. 1. If desired, the pattern cutter 52 can cut a series of cutouts in the tab portion of the granule covered sheet 40, and cut a series of notches in the underlay portion of the granule covered sheet 40.

The pattern cutter 52 may also cut the granule covered sheet 40 into a continuous underlay sheet 66 and a continuous overlay sheet 68. The underlay sheet 66 may be directed to be aligned beneath the overlay sheet 68, and the two sheets may be laminated together to form a continuous laminated sheet 70. As shown in FIG. 1, the continuous underlay sheet 66 may be routed on a longer path than the path of the continuous overlay sheet 68. Further downstream, the continuous laminated sheet 70 may be passed into contact with a rotary length cutter 72 that cuts the laminated sheet into individual laminated shingles 74.

In order to facilitate synchronization of the cutting and laminating steps, various sensors and controls may be employed. For example, sensors, such as photo eyes 86 and 88 can be used to synchronize the continuous underlay sheet 66 with the continuous overlay sheet 68. Sensors 90 can also be used to synchronize the notches and cutouts of the continuous laminated sheet with the end cutter or length cutter 72.

In one embodiment, the reinforcement tape may be attached to the shingle mat 12 prior to the application of the asphalt coating, as shown at 19A in FIG. 1. The tape 19A may be attached to the shingle mat 12 by any suitable means, such as hot, melted asphalt, or other adhesives.

In another embodiment, the reinforcement tape may be attached to the granule covered sheet 40, as shown at 19B in FIG. 1. The tape 19B may be attached to the granule covered sheet 40 by any suitable means, such as hot, melted asphalt, or other adhesives.

In another embodiment, the reinforcement tape may be attached to a lower surface (downwardly facing as viewed in FIG. 1) of the mat 12, the first asphalt coated sheet 18, the second asphalt coated sheet 22, or the granule covered sheet 40, as shown at 19C and 19D in FIG. 1. The tape 19C may be attached to the mat 12, the first asphalt coated sheet 18, the second asphalt coated sheet 22, or the granule covered sheet 40 by any suitable means, such as hot, melted asphalt, other adhesives, or suitable fasteners. In such an embodiment, the reinforcement tape 19C and 19D may be attached to the lower surface of the nail zone of either of the overlay sheet 68 or the underlay sheet 66, thereby reinforcing and strengthening the nail zone as described herein.

It will be understood, however, that in any of the embodiments described herein, reinforcement material may be applied as an extruded or liquid material, such as a polymer, that will adhere to the mat 12, the first sheet 18, the second sheet 22, the granule covered sheet 40, or the lower surface of the underlay sheet 66 or the overlay sheet 68. Additionally, the reinforcement material may be applied to the laminated roofing shingle 74, as described below.

Referring now to FIG. 2, a laminated roofing shingle is shown generally at 74. In the illustrated embodiment, the shingle 74 includes the overlay sheet 68 attached to the underlay sheet 66 and has a first end 74A and a second end 74B. The shingle 74 also includes a longitudinal axis A. The overlay sheet 68 may include a headlap portion 76 and a tab portion 78. The headlap portion 76 may include a lower zone 76A and an upper zone 76B. The tab portion 78 defines a plurality of tabs 80 and cutouts 82 between adjacent tabs 80. In the illustrated embodiment, the tab portion 78 includes four tabs 80, although any suitable number of tabs 80 may be provided. The headlap portion 76 and the tabs 80 may include one or more granule patterns thereon. Each cutout 82 has a first height H1. In the illustrated embodiment, the cutouts 82 are shown as having the same height H1. It will be understood however, that each cutout 82 may be of different heights. A line B is collinear with an upper edge 82A of the cutouts 82 and defines an upper limit of an exposed region 84 of the underlay sheet 66. In the illustrated embodiment, the height of the exposed region 84 is equal to the first height H1, although the height of the exposed region 84 may be any desired height. In a shingle wherein the cutouts 82 have different heights, the line B may be collinear with an upper edge 82A of the cutout 82 having the largest height. In the illustrated embodiment, the overlay sheet 68 has a second height H2.

The reinforcement tape 19 may be disposed longitudinally on the headlap portion 76. In the illustrated embodiment, the tape 19 extends longitudinally from the first end 74A to the second end 74B of the shingle 74 within the lower zone 76A of the headlap portion 76. A lower edge 19A of the tape 19 may be spaced apart from the line B by a distance D1, and an upper edge 19B of the tape 19 may be spaced apart from the line B by a distance D2. In one embodiment, the distance D1 is within the range of from about ¼ inch to about ¾ inch. In another embodiment, the distance D1 is about ½ inch. In one embodiment, the distance D2 is within the range of from about 1¾ inches to about 2¼ inches. In another embodiment, the distance D2 is about 2 inches. The distances D1 and D2 may, however, be of any other desired length. For example, if desired, the tape 19 may substantially cover the entire headlap portion 76 of the overlay sheet 68. It will be further understood, however, that one or more additional lengths of tape may be disposed longitudinally on the headlap portion 76, such as shown by the phantom line 19' in FIG. 2. It will be understood that the reinforcement material need not extend from the first end 74A to the second end 74B of the shingle 74, and may be disposed in one or more sections or portions on the shingle 74.

The tape 19 defines a nail zone 98 and may include text such as "nail here •", as shown in FIG. 2. It will be understood, however, that any other text or other indicia may be included on the tape 19. It will also be understood that the tape 19 can be provided without such text or indicia. Such indicia on the tape 19 ensure that the nail zone 98 may be easily and quickly identified by the shingle installer.

In the embodiment illustrated in FIG. 2, the underlay sheet 66 includes a leading edge 66A and a trailing edge 66B and has a third height H3. In the illustrated embodiment, the trailing edge 66B of the underlay sheet 66 is spaced apart from the line B by a distance D3. As shown, the distance D3 is about ⅜ inch, however, the distance D3 may be any desired distance.

In the illustrated embodiment, the third height H3 of the underlay sheet 66 is less than one-half the second height H2 of the overlay sheet 68. The overlay sheet 68 and the underlay sheet 66 thereby define a two-layer portion of the laminated shingle 74 and a single-layer portion of the laminated shingle 74, wherein at least a portion of the tape 19 is adhered to the single-layer portion of the laminated shingle 74. Alternately, the third height H3 of the underlay sheet 66 may be equal to one-half the second height H2 of the overlay sheet 68, or greater than one-half of the second height H2 of the overlay sheet 68. Such a relationship between the underlay sheet 66 and the overlay sheet 68 allows the tape 19 to be positioned such that a reinforced nail zone is provided at a substantially single-layer portion of the shingle 74.

In another embodiment of the invention, a layer of material, such as talc or sand, may be applied to the first asphalt coated sheet 18 shown in FIG. 1. The material may be applied by any desired means to an upper surface of the first asphalt coated sheet 18. In one embodiment, the material may be applied to the portion of the first asphalt coated sheet 18 that will become the portion of the overlay sheet 66 shown covered by the tape 19 in FIG. 2. Such a material may reduce tackiness of the portions of the second asphalt coated sheet 22 to which the material has been applied, and thereby provide a surface to which granules substantially will not adhere.

In the exemplary shingle 74 illustrated in FIG. 2, the shingle 74 may have a nail pull-through value, measured in accordance with a desired standard, such as prescribed by ASTM test standard D3462. For example, the shingle 74 may have a nail pull-through value that is greater than in an otherwise identical shingle having no such tape 19. In one embodiment, the shingle 74 may have a nail pull-through value within the range of from about ten percent to about 100 percent greater than in an otherwise identical shingle having no such tape 19. In another embodiment, the shingle 74 may have a nail pull-through value about 50 percent greater than in an otherwise identical shingle having no such tape 19.

In another embodiment, a shingle having a reinforcement tape 19 formed from polyester film having a thickness of about 0.5 mils, may have a nail pull-through value about 13.3 percent greater than in an otherwise identical shingle having no such tape 19.

In another embodiment, a shingle having a reinforcement tape 19 formed from polyester film having a thickness of about 3.0 mils, may have a nail pull-through value about 62.3 percent greater than in an otherwise identical shingle having no such tape 19.

In another embodiment, a shingle having a reinforcement tape 19 formed from polyester film having a thickness of about 4.0 mils, may have a nail pull-through value about 86.0 percent greater than in an otherwise identical shingle having no such tape 19.

In another embodiment, a shingle having a reinforcement tape 19 formed from polyester film having a thickness of about 5.0 mils, may have a nail pull-through value about 112.7 percent greater than in an otherwise identical shingle having no such tape 19.

Because there may be substantially no granules in the portion of the overlay sheet 68 covered by the tape 19, the weight of the shingle 74 may be reduced relative to an otherwise identical shingle having no such tape 19. For example, the weight of the exemplary shingle 74 illustrated in FIG. 2, may be reduced within the range of from about four percent to about six percent relative to the weight of an otherwise identical shingle having no such tape 19. The material and transportation cost may also be reduced.

Although the invention has been disclosed in the context of a laminated shingle 74, it will be understood that the reinforcement tape 19 may be attached to any other type of shingle, such as a single layer shingle.

Figure 3:
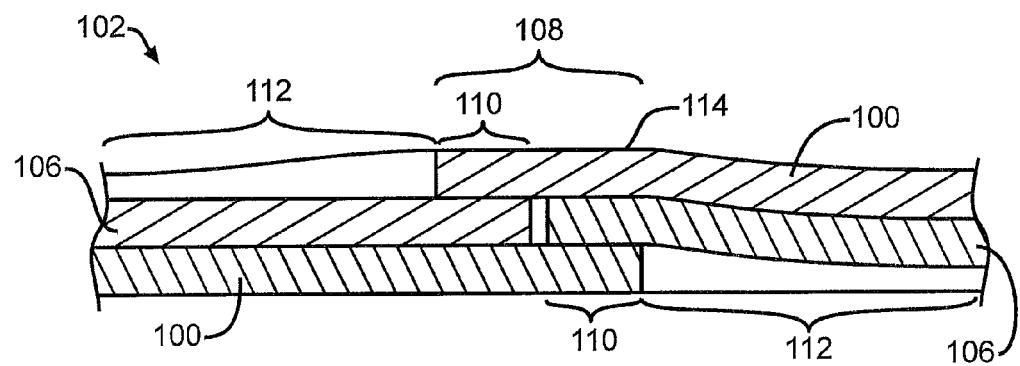
FIG. 3 is a schematic sectional view of a pair of laminated roofing shingles of the prior art stacked together, shown in exaggerated thickness to illustrate humping of the stacked shingles.

As shown in FIG. 3, laminated roofing shingles 100 of the prior art are stacked in a bundle 102. Only a pair of such shingles 100 are illustrated in FIG. 3, with every other shingle 100 inverted and turned 180 degrees. It will be understood, however, that the shingles 100 may be stacked such that every other of such shingles 100 are either inverted or turned 180 degrees, or both. This stacking method minimizes uneven build in the bundle 102 caused by the difference in thickness between the area of the shingle 100 that includes the underlay sheet 106 and the area that does not include the underlay sheet 106. A problem may occur, however, along a central area 108 of the bundle 102 because central areas 110 of the shingles 100 are double-layered, whereas the cutout portions 112 of the shingles 100 adjacent the central areas 110 are single-layered. The difference in thickness causes a ridge or hump 114 along the central area 108 of the bundle 102 that becomes progressively higher as the number of shingles 100 in the bundle 102 increases.

Figure 4:
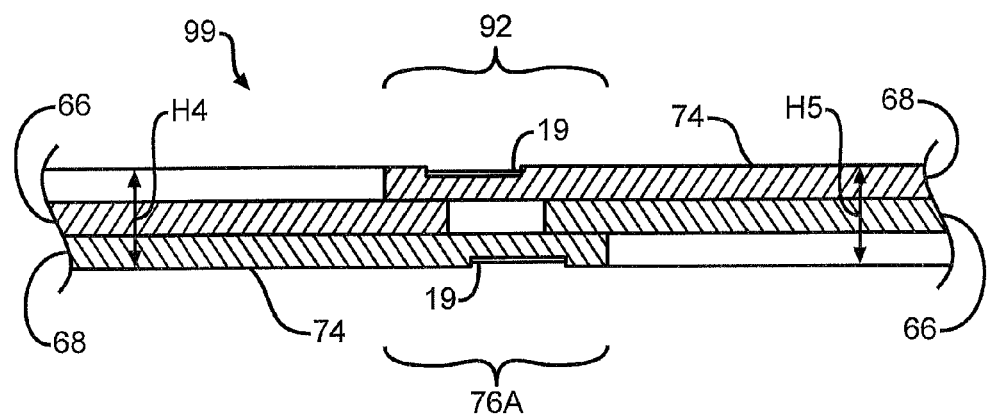
FIG. 4 is a schematic sectional view of a pair of laminated roofing shingles according to the invention stacked together, shown in exaggerated thickness to illustrate how the reinforcement members of adjacent shingles cooperate to reduce humping of the stacked shingles.

FIG. 4 is a schematic sectional view of a representative pair of stacked shingles 74 manufactured according to the present invention. As shown in FIG. 4, the laminated roofing shingles 74 are stacked such that every other of the shingles 74 is inverted and turned 180 degrees relative to an adjacent one of the shingles 74 to define a bundle 99. It will be understood, however, that the shingles 74 may be stacked such that every other of such shingles 74 are either inverted or turned 180 degrees, or both. The bundle 99 includes a central area 92. In the illustrated embodiment, the central area 92 includes the lower zones 76A and reinforcement tape 19 of each shingle 74, and includes the portion of each laminated roofing shingle 74 wherein the shingle 74 is double-layered. In contrast to the prior art shingles 100, when the laminated shingles 74 of the invention are stacked, the areas of the adjacent shingles 74 having no granules, such as the areas covered by the reinforcement tapes 19, cooperate to advantageously reduce humping in the central area 92 of the bundle of stacked shingles 74. As best shown in FIG. 4, the central area 92 of the bundle, as represented by the pair of shingles 74 illustrated, has a fourth height H4 substantially identical to a fifth height H5 of a remainder of the bundle outside of the central area 92.

The principle and mode of operation of this invention have been described in its various embodiments. However, it should be noted that this invention may be practiced otherwise than as specifically illustrated and described without departing from its scope.

What is claimed is:

1. A roofing shingle comprising:
    an overlay sheet including a headlap portion and a tab portion;
    an underlay sheet secured to the overlay sheet such that a region of the underlay sheet overlaps a region of the headlap portion of the overlay sheet, said underlay sheet having a substantially uniform thickness; and
    a reinforcement member secured to the headlap portion, the reinforcement member being formed from a material selected from the group consisting of paper, film, scrim, woven, and non-woven material, wherein the reinforcement member and the portion of the headlap portion to which the reinforcement member is secured improve nail pull-through, wherein at least some of the reinforcement member does not overlap the overlapping regions of the headlap portion and the underlay sheet; and
    wherein said reinforcement member provides said overlay sheet with a non-uniform thickness.

2. The roofing shingle defined in claim 1, wherein the nail pull-through value has an average value of 90 newtons when measured at a temperature of 23° C.±2° C.

3. The roofing shingle defined in claim 1, wherein the nail pull-through value has an average value of 130 newtons when measured at a temperature of 23° C.±2° C.

4. The roofing shingle defined in claim 1, wherein the nail pull-through value has an average value of 104 newtons when measured at a temperature of 0° C.±2° C.

5. The roofing shingle defined in claim 1, wherein the nail pull-through value has an average value of 180 newtons when measured at a temperature of 0° C.±2° C.

6. The roofing shingle defined in claim 1, further including a plurality of granules secured the headlap portion of the overlay sheet and not secured to the reinforcement member.

7. The roofing shingle defined in claim 1, wherein the reinforcement member and the headlap portion define a nail pull-through value that is at least 13.3 percent greater than an otherwise identical shingle having no said reinforcement member.

8. The roofing shingle defined in claim 1, wherein the reinforcement member and the headlap portion define a nail pull-through value that is at least 62.3 percent greater than an otherwise identical shingle having no said reinforcement member.

9. The roofing shingle defined in claim 1, wherein the reinforcement member and the headlap portion define a nail pull-through value that is at least 86.0 percent greater than an otherwise identical shingle having no said reinforcement member.

10. The roofing shingle defined in claim 1, wherein the reinforcement member and the headlap portion define a nail pull-through value that is at least 112.7 percent greater than an otherwise identical shingle having no said reinforcement member.

11. The roofing shingle defined in claim 1, wherein the reinforcement material is formed from a paper material.

12. The roofing shingle defined in claim 1, wherein the reinforcement material is formed from a film material.

13. The roofing shingle defined in claim 1, wherein the reinforcement material is formed from a scrim material.

14. The roofing shingle defined in claim 1, wherein the reinforcement material is formed from a non-woven material.

15. The roofing shingle defined in claim 1, wherein the reinforcement material is formed from a woven material.

16. The roofing shingle defined in claim 1, wherein the reinforcement material is formed from a polymeric material.

17. The roofing shingle defined in claim 16, wherein the polymeric material is polyethylene.

18. The roofing shingle defined in claim 17, wherein the reinforcement material is formed from a woven material.

19. The roofing shingle defined in claim 18, wherein the overlay sheet has an overlay sheet height, and wherein the underlay sheet has a height approximately equal to half of the overlay sheet height.

20. The roofing shingle defined in claim 18, wherein the overlay sheet has an overlay sheet height, and wherein the underlay sheet has a height less than approximately half the overlay sheet height.

21. A roofing shingle comprising:
    an overlay sheet including a headlap portion and a tab portion;

an underlay sheet secured to the overlay sheet such that a region of the underlay sheet overlaps a region of the headlap portion of the overlay sheet, said underlay sheet having a substantially uniform thickness; and a reinforcement member secured to the headlap portion, the reinforcement member being formed from a woven material, wherein at least some of the reinforcement member does not overlap the overlapping regions of the headlap portion and the underlay sheet, and wherein the headlap portion defines a first nail pull-through value, and wherein the reinforcement member and the headlap portion define a second nail pull-through value that is at least 13.3 percent greater than the first nail pull-through value, and wherein said reinforcement member provides said overlay sheet with a non-uniform thickness.

22. The roofing shingle defined in claim 21, wherein the reinforcement member and the headlap portion define a second nail pull-through value that is at least 62.3 percent greater than the first nail pull-through value.

23. The roofing shingle defined in claim 21, wherein the reinforcement member and the headlap portion define a second nail pull-through value that is at least 86.0 percent greater than the first nail pull-through value.

24. The roofing shingle defined in claim 21, wherein the reinforcement member and the headlap portion define a second nail pull-through value that is at least 112.7 percent greater than the first nail pull-through value.

25. The roofing shingle defined in claim 21, wherein the woven material is a polymeric material.

26. The roofing shingle defined in claim 25, wherein the polymeric material is polyethylene.

27. The roofing shingle defined in claim 21, wherein the nail pull-through value has an average value of 90 newtons when measured at a temperature of 23° C.±2° C.

28. The roofing shingle defined in claim 21, wherein the nail pull-through value has an average value of 130 newtons when measured at a temperature of 23° C.±2° C.

29. The roofing shingle defined in claim 21, wherein the nail pull-through value has an average value of 104 newtons when measured at a temperature of 0° C.±2° C.

30. The roofing shingle defined in claim 21, wherein the nail pull-through value has an average value of 180 newtons when measured at a temperature of 0° C.±2° C.

31. The roofing shingle defined in claim 21, further including a plurality of granules secured the headlap portion of the overlay sheet and not secured to the reinforcement member.

32. The roofing shingle defined in claim 21 wherein said reinforcement member is positioned such that a reinforced nail zone is provided at a substantially single-layer portion of said roofing shingle.

33. A roofing shingle comprising:
an overlay sheet including a headlap portion and a tab portion;
an underlay sheet secured to the overlay sheet such that a region of the underlay sheet overlaps a region of the headlap portion of the overlay sheet, said underlay sheet having a substantially uniform thickness; and
a reinforcement member secured to the headlap portion, the reinforcement member being formed from a woven material, wherein the reinforcement member and the portion of the headlap portion to which the reinforcement member is secured improve nail pull-through, wherein at least some of the reinforcement member does not overlap the overlapping regions of the headlap portion and the underlay sheet; and
wherein said reinforcement member provides said overlay sheet with a non-uniform thickness.

* * * * *